(12) United States Patent
Slezak et al.

(10) Patent No.: US 7,224,897 B1
(45) Date of Patent: May 29, 2007

(54) METHOD OF PRECONFIGURING OPTICAL PROTECTION TRAILS IN A MESH-CONNECTED AGILE PHOTONIC NETWORK

(75) Inventors: James Slezak, Ottawa (CA); Greg Peter Friesen, Ottawa (CA); Peter David Roorda, North Ottawa (CA)

(73) Assignee: Lucent Technologies Inc., Murray Hill, NJ (US)

( * ) Notice: Subject to any disclaimer, the term of this patent is extended or adjusted under 35 U.S.C. 154(b) by 698 days.

(21) Appl. No.: 10/424,396

(22) Filed: Apr. 28, 2003

(51) Int. Cl.
 *G02F 1/00* (2006.01)
(52) U.S. Cl. .............. 398/5; 398/10; 398/25
(58) Field of Classification Search .......... 398/4–5, 398/19, 57, 9–14, 17, 29, 33; 370/218, 221, 370/226
 See application file for complete search history.

(56) References Cited

U.S. PATENT DOCUMENTS

| | | | |
|---|---|---|---|
| 6,901,048 B1 * | 5/2005 | Wang et al. | 370/228 |
| 6,914,880 B1 * | 7/2005 | Grover et al. | 370/221 |
| 2002/0071392 A1 | 6/2002 | Grover et al. | 370/241 |
| 2003/0229807 A1 * | 12/2003 | Qiao et al. | 713/200 |
| 2004/0109407 A1 * | 6/2004 | Grover et al. | 370/218 |

OTHER PUBLICATIONS

"Cycle-Oriented Distributed Preconfiguration: Ring-Like Speed with Mesh-Like Capacity for Self-Planning Network Restoration" Grover, IEEE, 1998, p. 537-543.

* cited by examiner

Primary Examiner—Dzung Tran

(57) ABSTRACT

The method of pre-configuring the optical protect paths in an agile photonic network establishes a protection trail for each optical working path that may be set-up in the network. The pre-configuration is based on building an electrical layer (EXC) graph that takes into account all the connection demands in the network, and finding on this EXC graph a plurality of cycles. Next, the EXC cycles are validated at the optical layer, and are further validated against constraints. The method attempts to find an optimal cycles solution, without exhausting all possible variants.

21 Claims, 10 Drawing Sheets

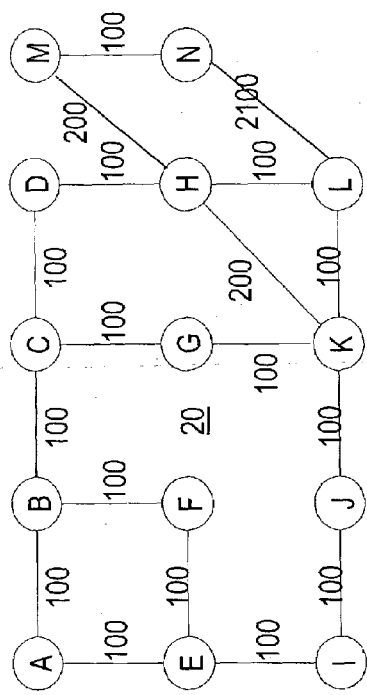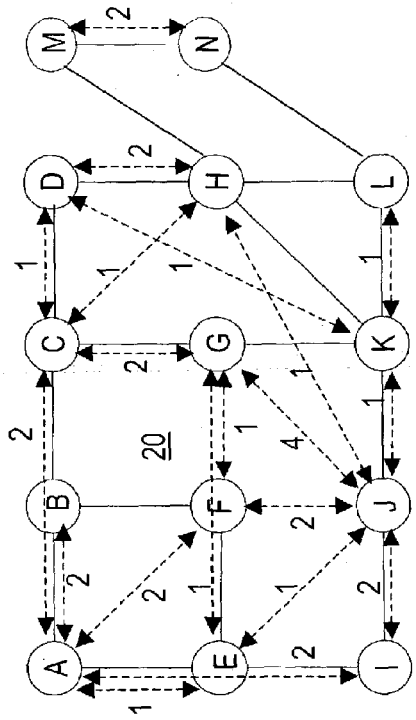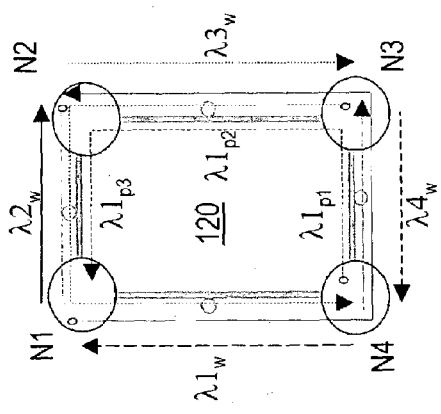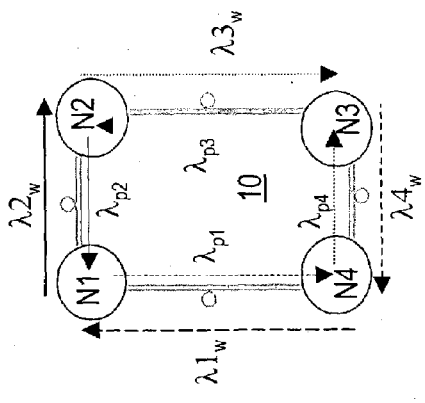
FIGURE 2a
FIGURE 2b
FIGURE 1a
FIGURE 1b

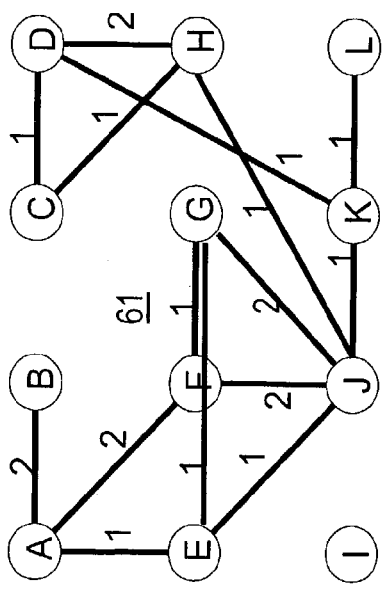
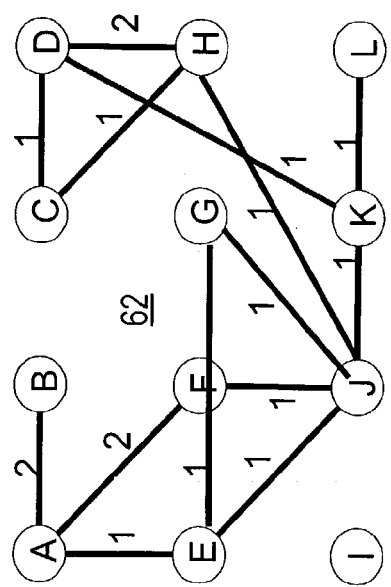
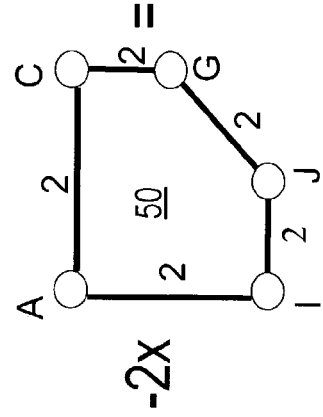
FIGURE 6a
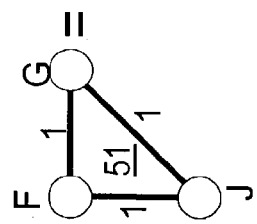
FIGURE 6b
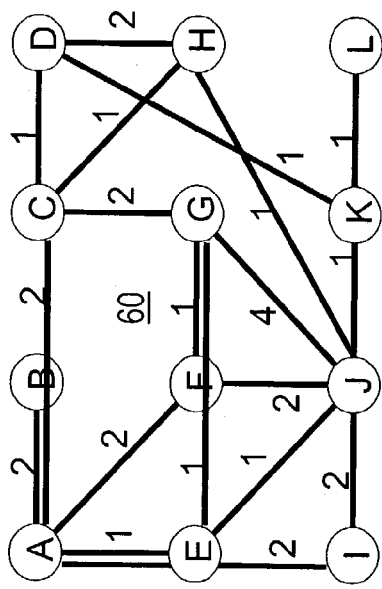
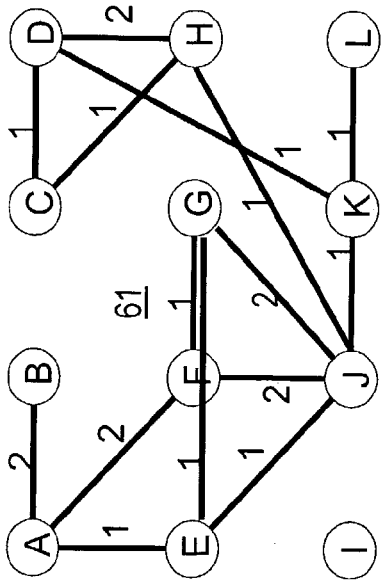

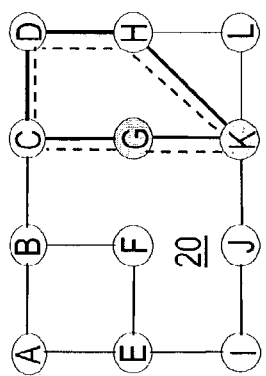
FIGURE 9d
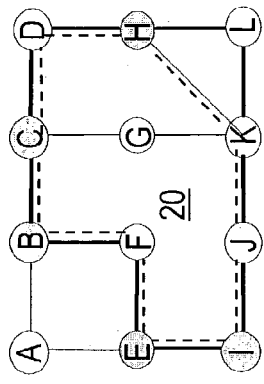
FIGURE 9e
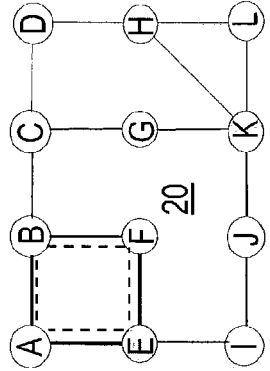
FIGURE 9f
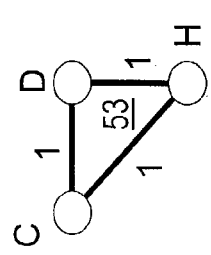
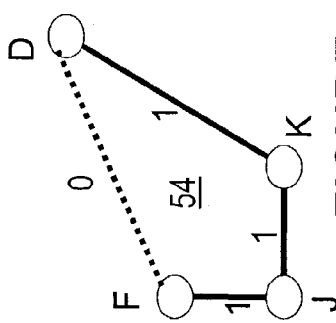
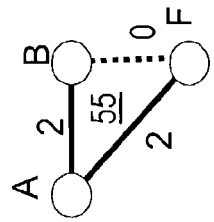
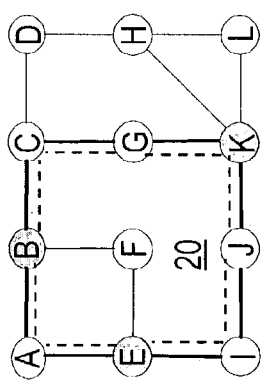
FIGURE 9a
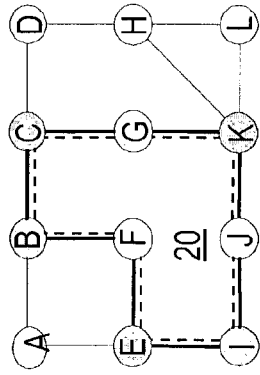
FIGURE 9b
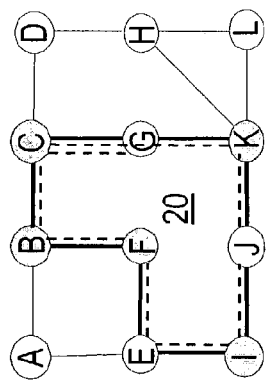
FIGURE 9c
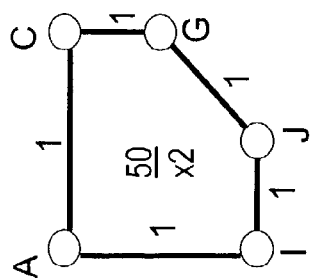
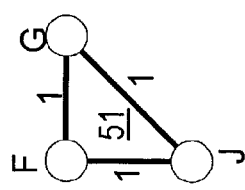

METHOD OF PRECONFIGURING OPTICAL PROTECTION TRAILS IN A MESH-CONNECTED AGILE PHOTONIC NETWORK

RELATED US PATENT APPLICATIONS

U.S. patent application Ser. No. 10/061,623 "Routing Cycles for Wavelength Switched Optical Networks" (Slezak et al.), filed Feb. 1, 2002 and assigned to Innovance Inc.

U.S. patent application Ser. No. 09/909,265, entitled "Wavelength Routing and Switching Mechanism for a Photonic Transport Network", Smith et al., filed Jul. 19, 2001, assigned to Innovance Networks.

These patent applications are incorporated herein by reference.

FIELD OF THE INVENTION

The invention resides in the field of optical telecommunications networks, and is directed in particular to a method for pre-configuring protection trails in a mesh-connected agile photonic network.

BACKGROUND OF THE INVENTION

A linear topology can only protect against single fiber link failures. Thus, a "1:1" linear system has an equal number of working and protection links; a "1:N" linear system has N working channels and one shared protection channel.

Lately, rings have become the topology of choice in fiber deployment. The prime motivator for rings versus linear transport is higher survivability. A ring protects against simultaneous failure of the protection and working fibers (i.e. cable cuts) and saves the intra-ring and inter-ring passthrough traffic during node failure/isolation. Rings offer cost effective transport solutions while delivering enhanced network survivability.

Currently, two types of rings are used, namely, unidirectional path switched rings (UPSR), and bidirectional line switched rings (BLSR). The UPSRs are currently used in access networks and therefore they are built for lower rates, which are sufficient for access link demands. UPSR protection switching is done at the SONET path level. The operation of UPSRs is standardized by the BellCore GR-1400-CORE standard, and there are OC-3/12 rate products available. The BLSR are currently used in the backbone networks and therefore they are built for higher rates. Switching is done at the SONET line layer. The operation of BLSRs is standardized by the BellCore GR-1230-CORE standard, and there are OC-12/48 rate products available.

The paper "Cycle-oriented Distributed Preconfiguration: Ring-like Speed with Mesh-like Capacity for Self-planning Network Restoration" by W. Grover et al, 1998 IEEE, pg. 537–543 describes a strategy of pre-failure cross-connection between the protection links of a mesh network, which achieves restoration of connections with little additional spare capacity. While the protection links are connected into p-Cycles, the method is different than self-healing rings because each pre-configured cycle contributes to the restoration of more failure scenarios than can a ring. If a span 'on' the p-Cycle fails, the cycle contributes with one restoration path. If a span off the cycle, but straddling it fails, two restoration paths may be obtained from a cycle.

The next step in evolution of communications is the agile photonic network APN, where the current point-to-point linear/ring architecture characterized by fixed channel allocation is replaced by an agile architecture characterized by a flexible end-to-end channel allocation. Agile photonic networks combine a few basic concepts to deliver cost reduction and scalability of the network, while enabling rapid set-up of bandwidth.

Transparency leverages all-optical switching to facilitate cost-effective connection set-up across multiple segments of the network, without having to undergo optical-electrical-optical conversions. Transparent photonic switching enables cost savings, space and power reduction, and also the ability to rapidly turn up new wavelengths across a network. Full range tunability provides the mechanism to deploy generic capacity pools, reducing over-provisioning and risk of stranded capital, and making transparency and agile reach manageable. In addition, operational viability of the APN requires that these concepts be automated and simplified. Such a network is described in the U.S. patent application "Architecture For A Photonic Transport Network", (Roorda et al.), Ser. No. 09/876,391, filed Jun. 7, 2001 and assigned to Innovance Inc.

The APN allows activation of wavelengths from any point to any other point across the network. This function is automated to accommodate the addition or reconfiguration of wavelength patterns to manage changes of connection patterns and incremental network growth. The APN is able to automatically provision the routes in an efficient manner to allow revenue collection based on the class of service of each individual connection. The route provisioning mechanism is based on wavelengths becoming resources deployable and manageable across the network.

Since the operation of the agile network differs from that of pt—pt networks, traditional traffic protection schemes (electrical) are not directly applicable to optical switching. On the other hand, agility offers more flexibility in designing protections schemes based on various opportunities and perspectives.

There is a need to optimize wavelength utilization for the protection traffic in a mesh connected agile photonic network.

SUMMARY OF THE INVENTION

It is an object of the invention to provide new ways of routing the protection trails in a mesh-connected agile photonic network.

According to one aspect, the invention provides a method of pre-configuring optical protection trails in an agile network (APN) where each connection demand is automatically set-up along a respective working trail, each working trail having one or more successive optical working paths. The method comprises: (a) at the electrical layer, preparing an EXC graph where each connection demand is represented by an EXC link; (b) extracting a best valid cycle from the EXC graph; and (c) at the optical layer, pre-configuring the best cycle into protect trails, each protect trail associated with an optical working path on the best valid cycle.

According to another aspect, the invention is directed to a method of automatically re-routing a connection demand along a protect trail whenever an optical working path is affected by a fault. The method comprises: generating an optical-layer cycle that has a plurality of successive optical paths; for each optical path on the cycle, identifying the reminder of the optical paths on the cycle as an optical protect trail; and pre-configuring a plurality of protection switching scenarios by associating each optical path on the cycle with a respective optical protect trail for enabling fast traffic recovery when any of the optical working paths fails.

Still further, the invention provides a cycles management unit for sharing the protection bandwidth between a plurality of optical working paths in an agile photonic network, comprising: a trail routing unit for automatically setting-up a working trail for each connection demand, the working trail having one or more successive optical working paths; a cycles solution generator for providing a cycles basis for a given configuration of connection demands in the APN; a cycles validating unit for identifying a best valid cycle in the cycles basis; and a cycles processing unit for associating each optical working path on the best valid cycle with a respective protect trail on the best valid cycle.

An advantage of the mesh routing method of this invention is that it optimizes the bandwidth utilization across the network by reducing the number of protect wavelengths.

BRIEF DESCRIPTION OF THE DRAWINGS

The foregoing and other objects, features and advantages of the invention will be apparent from the following more particular description of the preferred embodiments, as illustrated in the appended drawings, where:

FIGS. 1a and 1b illustrates a comparison between current architectures with individual connection protection (FIG. 1a) and the mesh routing method according to the invention (FIG. 1b);

FIG. 2a shows the optical layer of a mesh-connected agile photonic network (APN) used as an example for the method according to the invention;

FIG. 2b shows an example of connection requests (demands) in the network of FIG. 2a;

FIG. 5a shows a spanning tree built for finding the fundamental cycles for the graph of FIG. 4;

FIG. 5b shows additional cycles that may be constructed on the spanning tree of FIG. 5a;

FIGS. 6a–6c show how cycles are successively extracted from the graph of FIG. 4;

FIGS. 9a–9i show the optical layer implementation of the cycles for the network of FIG. 2a and the demands of FIG. 2b.

DETAILED DESCRIPTION OF THE PREFERRED EMBODIMENTS

Figure 3A:
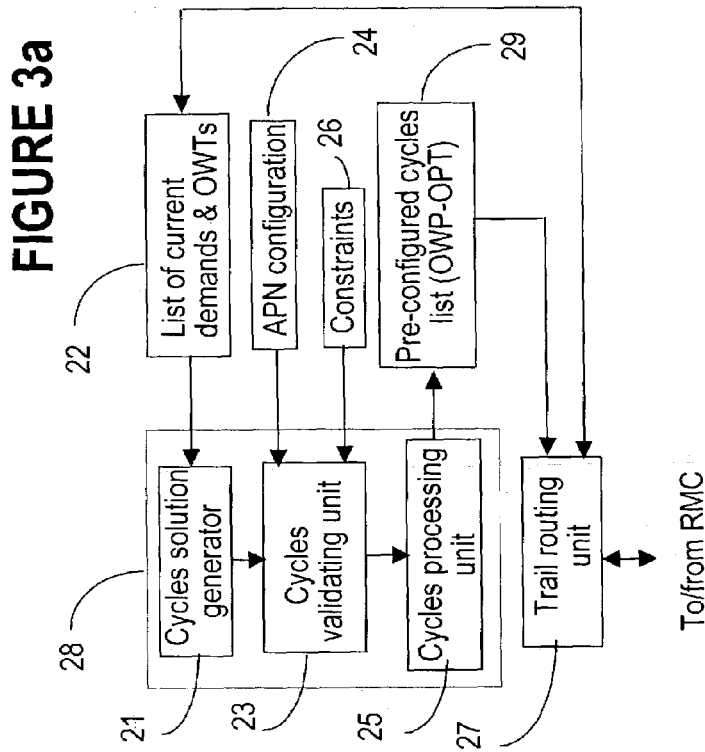
FIG. 3a is block diagram of the modules involved in the routing the working and protection paths in an agile photonic network.

The following description is of a preferred embodiment by way of example only and without limitation to combination of features necessary for carrying the invention into effect.

FIG. 1a illustrates a simplified example of an agile photonic network APN 20 with four nodes N1–N4, and four working connections carried by channels $\lambda 1_w$–$\lambda 4_w$.

The term "network node" or "node" refers to a node that performs optical switching and add/drop, and may also perform signal regeneration. FIG. 1a illustrates only the end-nodes for each optical connection and not the intermediate switching nodes.

The term "optical path" refers to the path of a channel (wavelength) from a node where the channel is added, to a node where the channel is dropped. The term "trail" refers to an end-to-end route set-up in response to a connection demand. An optical trail carries the user traffic from the source node to the destination node and may be established along one or more optical paths, according to the number of regenerators needed to successfully carry the traffic from the source to the destination.

In this example three protect wavelengths protect each working channel. For example, connection N4–N1 carried by working wavelength $\lambda 1_w$ is protected by protect wavelengths $\lambda 1_{p1}$, $\lambda 1_{p2}$ and $\lambda 1_{p3}$, connecting the respective nodes N4–N3, N3–N2 and N2–N1. Wavelengths $\lambda 2_{p1}$, $\lambda 2_{p2}$ and $\lambda 21_{p3}$ are used to protect the working connection $\lambda 2_w$, etc. In this simplified scenario, each fiber link carries four wavelengths and each connection needs four wavelengths, one for the working traffic and three for the protect traffic. It is to be noted that the protect trails for the four connections need not necessarily pass through the same nodes as they do in this example, nor the protect trails need to use three optical paths (three channels). These assumptions were made for the sake of simplicity. In practice, a protect trail such as N1–N2–N3–N4 may pass through more or less nodes and may use more or less wavelengths than in this example. However, in general, in a complex mesh network a protect trail would rather travel a longer distance than the working trail, requiring eventually additional intermediate regeneration. It is also to be noted that the protect wavelengths may be idle for extended periods of time, being used only in the case of a fault or for carrying traffic of lower priority (which can be discarded in case of a protection switch). Therefore it is important to find a method of sharing the protect bandwidth.

FIG. 1b shows the same network and the same four working channels (paths), but this time using an optimized scenario for the protect wavelengths. Now, each fiber link carries a working and a protect wavelength; working wavelength $\lambda 1_w$ on link N4–N1 is protected by protect wavelengths $\lambda_{p2}$, $\lambda_{p3}$ and $\lambda_{p4}$, working wavelength $\lambda 4_w$ on link N3–N4 is protected by protect wavelengths $\lambda_{p1}$, $\lambda_{p2}$ and $\lambda_{p3}$, working wavelength $\lambda 3_w$ link N2–N3 is protected by protect wavelengths $\lambda_{p1}$, $\lambda_{p2}$ and $\lambda_{p4}$, and working wavelength $\lambda 2_w$ on link N2–N1 is protected by protect wavelengths $\lambda_{p1}$, $\lambda_{p3}$ and $\lambda_{p4}$. In other works, the working paths share the protection bandwidth.

It is readily apparent that sharing the protect bandwidth results in important savings in network resources (wavelengths, regenerators). To implement a bandwidth sharing scheme, the invention proposes to construct within an APN as many "cycles" as possible, so as to maximize the number of optical working paths that share the protection bandwidth. The selection of the cycles should take into consideration the length of the optical path between the end nodes (or the distance of the cycle) and the number of the nodes along a trails so as to maintain a balance between cost of the shared protection and the cost of the resources used (regenerators and wavelengths). Other selection criteria may also be considered, such as the time needed for selecting the cycles, the connection requests per node, etc.

Preparing an EXC Link Graph

FIGS. 2a and 2b provide an example of an APN 20 and a plurality of connection requests between the nodes of network 20, with a view to illustrate how the present invention operates. FIG. 2a shows the optical layer of network 20, i.e. the switching nodes A–N and the fiber between these nodes. The length in kilometers of each fiber link is also shown on the respective fiber link.

The term "connection demand" refers to a request for transporting user traffic between a source node and a destination node. It specifies the source and destination nodes, traffic bandwidth and rate, the class of service, the type of routing, explicit constraints, etc.

The term "EXC link" refers to the connection between the source and destination nodes at the electrical layer, where EO (electrical-to-optical) and OE (optical-to-electrical) conversion of the client signal occurs. An EXC link is not concerned with how the demand is routed in the network at the optical layer.

FIG. 2b shows by way of example all the demands active in network 20 and the number of the demands for each pair of nodes. For example, there are two demands A–B, four demands J–G, one demand M–N, etc. We assume that all demands shown in FIG. 2b are 192 STS-1s in this example.

FIG. 3a shows a block diagram of the modules pertinent to this invention. These modules are preferably part of a routing management unit, described in the above-identified patent application Ser. No. 09/909,265.

As described in the above-referenced patent application Ser. Nos. 09/876,391 and 09/909,265, the APN maintains a list of demands 22 and the corresponding optical working trails (OWT) that were calculated and routed by a routing management unit, which includes a routing module (RM), a regenerator placement module (RPM) and a wavelength assignment module (WAM), collectively identified on FIG. 3a by trail routing unit 27. The RM, RPM and WAM operate under control of a routing management control (RMC) unit. The routing management unit maintains a map with the current APN configuration (i.e. information of the optical configuration switching nodes and the fibers connecting these nodes), as shown at 24, which is obtained by the autodiscovery feature of the APN.

A cycles solution generator 21 identifies a plurality of cycles based on the list 22 with the current demands. A cycles validating unit 23 identified the valid cycles by eliminating from the solution the cycles that do not have support at the optical layer based on the APN configuration 24, and that do not satisfy one or more pre-defined constraints 26.

A cycles processing unit 25 prepares a list 29 with a pre-configured protection trail for each optical path active in the network. Each cycle of the solution provides an optical protection trail for each optical working path present in the APN, which lay on the respective cycle. In other words, each cycle is broken into an optical working path and a corresponding optical protection trail.

Figure 3B:
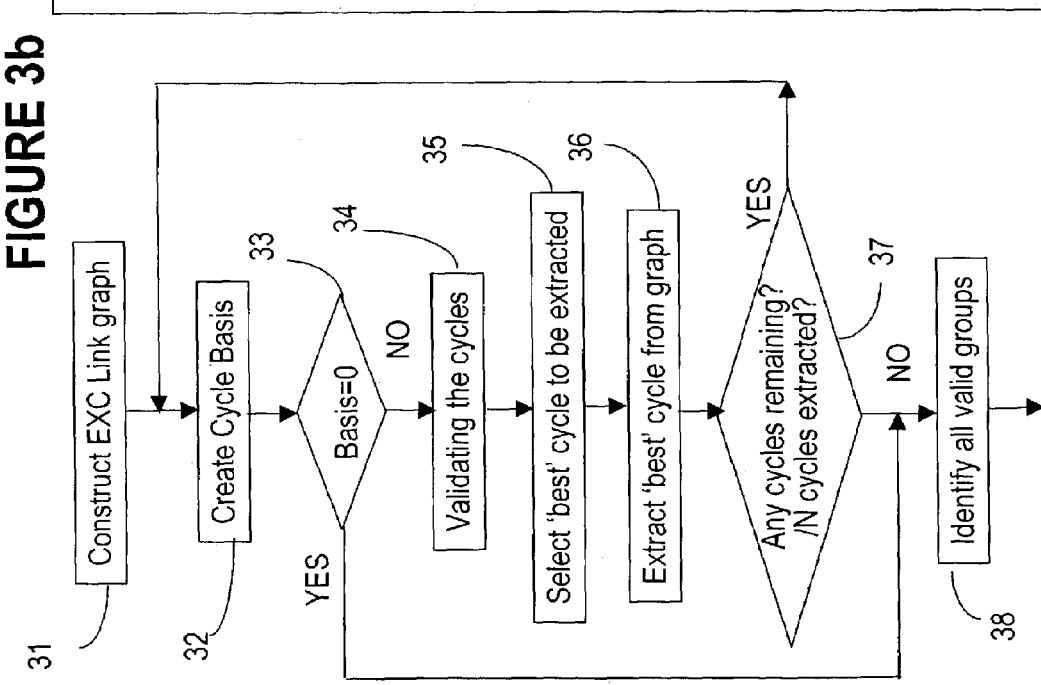
FIG. 3b is a flowchart of the method for routing the working and protection paths in an APN.

FIG. 3b provides the flowchart summarizing the steps for finding the cycles for a certain APN and a certain demand pattern. This flowchart is explained in connection with the graphs shown in the remaining figures.

First, an EXC link graph is constructed in step 31, to include the network nodes and all EXC links between the nodes for the network and the demands.

Figure 4:
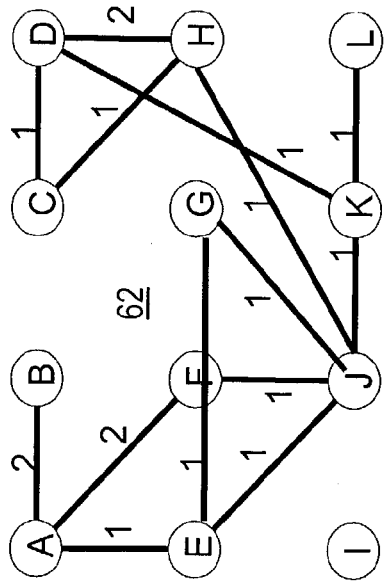
FIG. 4 shows a graph of EXC links for implementing the demands shown in FIG. 2b.
Figure 4:
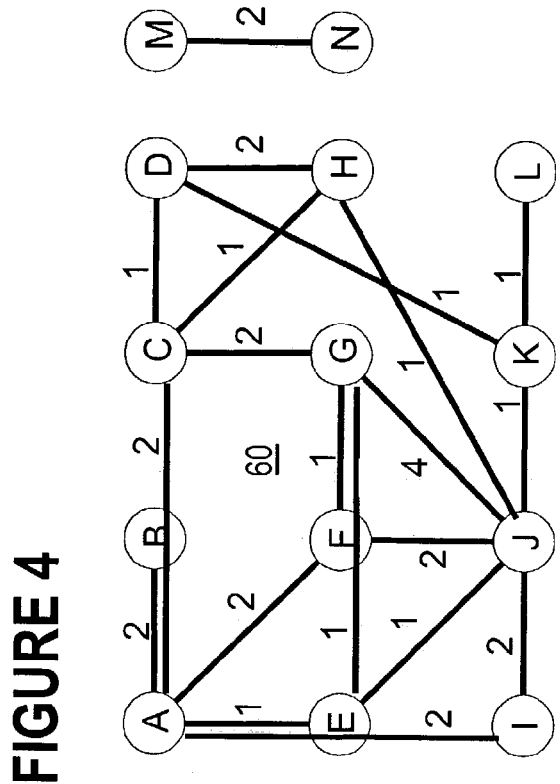

FIG. 4 illustrates a graph 60 with the current EXC (electrical cross-connect) links between the nodes of the network of FIG. 2a according to the demands pattern shown in FIG. 2b. We again assume that all EXC links are 192 STS-1s according to the same assumption in connection with the respective demands. In practice, two demands between the same two nodes may require for example 96 STS-1 s each, for a total of 192 STS-1 s; this involves EXC layer multiplexing, which is outside the scope of this invention. The graph of FIG. 4 also shows the number of EXC links, which as the same as the number of demands. As this graph refers to the EXC layer, the fiber links are not illustrated.

Prior to attempting to find cycles, any "onesies" are removed from the EXC graph on FIG. 4. An "onesie" is an EXC link that is not incident with any other EXC link. In this example, the M–N link is an onesie, and therefore the N–M link is treated like a 1+1 connection and removed from consideration in the following.

Creating the Cycle Basis

Figures 5A, 5B:
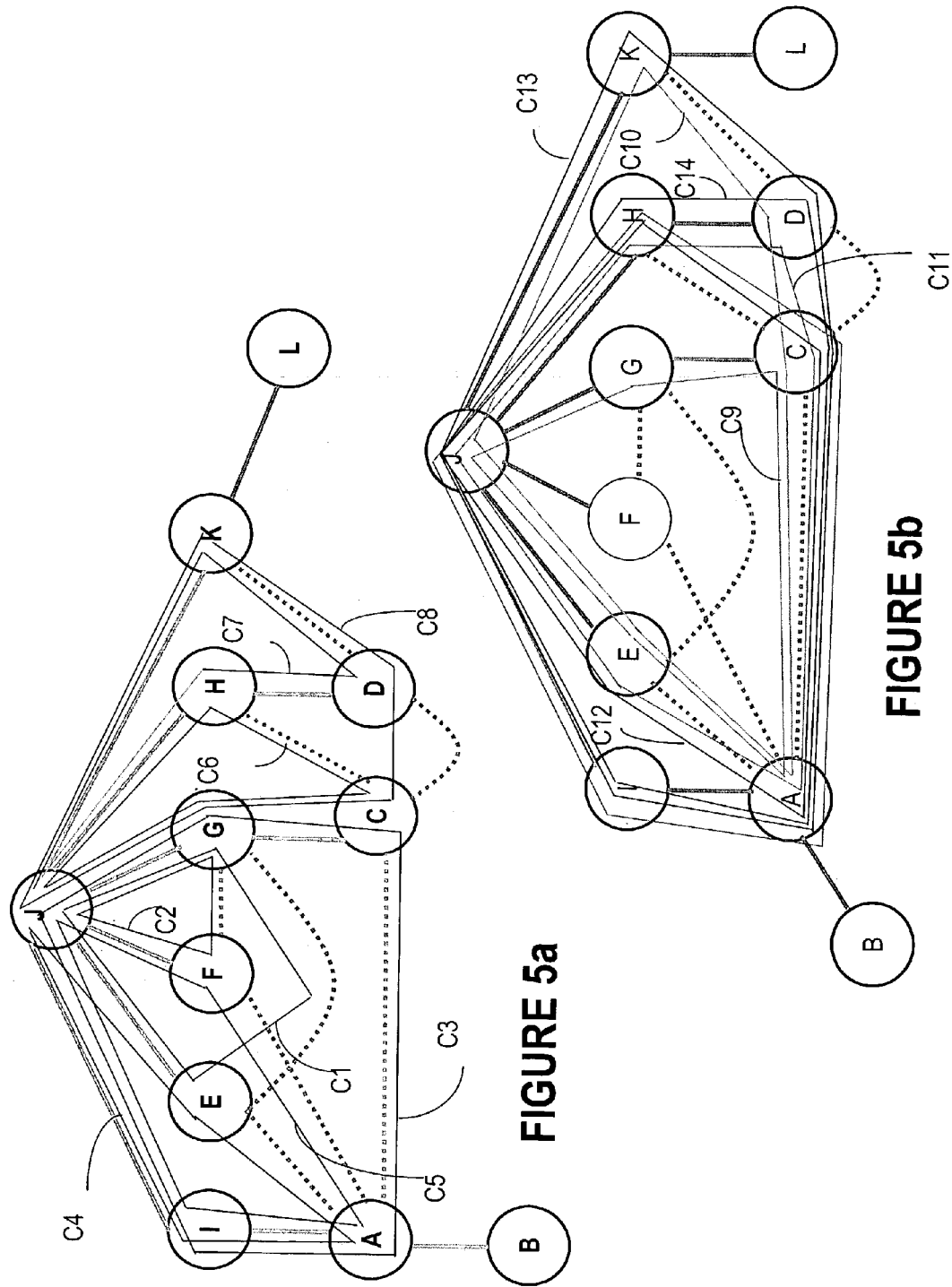

A cycle basis is created in step 32 for the respective optical network and the respective demands pattern (EXC links). First, a spanning tree is built as described in the above-referenced patent application Ser. No. 10/061,623. The root of the spanning tree is the node with the highest degree, the degree of a node being given in this case by the number of EXC links on that node. In the example of FIGS. 2a and 2b, node J has been selected as the root, since it has a degree of 11, while the degree of node A is 9, and that of node G is 7. The spanning tree for this example is illustrated in FIG. 5a. In short, the tree is constructed by "connecting" each node, starting from the root node, with all adjacent "unseen" nodes. The links that emanate from node J to the first 'depth' nodes I, E, G, H and K are shown in continuous lines on the tree. Thereafter, all links that emanate from the first 'depth' nodes to the second 'depth' nodes A, C and D are also shown in continuous lines, as well as the links between the nodes A and K to the third 'depth nodes B and L respectively. Finally, all links that have not been 'seen' yet are shown in dotted lines.

A fundamental cycle comprises the root node, two branches and a respective dotted line link connecting the branches. The fundamental cycles identified on the spanning tree of FIG. 6a are as follows:

JEGJ denoted with C1 JIAFJ denoted with C5
JFGJ denoted with C2 JGCHJ denoted with C6
JIACGJ denoted with C3 JHDKJ denoted with C7
JIAEJ denoted with C4 JGCDHJ denoted with C8

As noted in Ser. No. 10/061,623, this fundamental cycles solution form a basis for the cycle space, and this basis is not unique; the size of any basis for a particular network is at m−(n−1), where m is the number of links and n is the number of nodes. Thus, for network 20 that has 12 nodes and 19 EXC links, the number of fundamental cycles is 19−11=8.

Since the number of the cycles can be quite large for a large network, the search for a best valid cycle in the cycles basis may be limited to the first N cycles, set in the defaults. Or, the number of cycles may be limited to the first depth of the tree. The example used in this specification gives a relatively small number of fundamental cycles, so, that we will use the tree to create some additional cycle for the sake of the example, as shown in FIG. 5b. These additional cycles are:

JEACGJ denoted with C9 JIACDKJ denoted with C13
JEACDKJ denoted with C10 JIACDHJ denoted with C14
JEACDHJ denoted with C11 JIACHJ denoted with C15
JEACHJ denoted with C12

Validating the Cycles

Once a cycle basis has been created, branch "Yes" of decision block 33, the cycles in the basis are next validated, as shown in step 34. A valid cycle is one that has support at the optical layer OCh.

Since the cycles are constructed on the EXC link graph, these are electrical layer (EXC) cycles and not optical layer cycles (OCh cycles). However each EXC cycle must have an OCh cycle supporting it. In other words, an EXC cycle is valid only if there is an OCh cycle with the nodes traversed in the same order as on the EXC cycle. Therefore, since not all EXC cycles can be routed over network 20 at the optical layer, each of the cycles C1 to C15 should be validated first. For example, while there is no fiber between nodes J, F and G, the EXC cycle JFGJ is supported by an OCh cycle JIEFBCGKJ. On the other hand, the EXC cycle JIAFJ cannot be implemented at the OCh layer since the fiber I–E (if we go JIEABFEI) or the fiber B–F (if we go JIEABFB-CGKJ) must be used twice and in an opposite direction to close the optical circuit, which is not allowed if we protect a fiber cut.

Reference to FIG. 2a shows that cycles C4–C8 are invalid, while the remaining cycles C1–C3 and C9–C15 are valid.

Constraints may also be applied to validate the cycles, as for example distance constraints. The distance constraints may specify a certain maximum distance between two adjacent nodes of an optical protect trail (which is given by the reach of the transmitters), or/and the total length (the distance) of the cycle. Another constraint may for example be the number of the EXC links of the cycle. These constraints are imposed with a view to minimize the number of regenerators and wavelengths.

In our example:

$D_{C1}=200(JIE)+400(EFBCG)+200(G-K-J)=800$ km $D_{C2}=300(JIEF)+300(FBCG)+200(GKJ)=800$ km $D_{C3}=100(JI)+200(IEA)+200(ABC)+100(CG)+200(GKJ)=800$ km $D_{C9}=200(JIE)+100(EA)+200(ABC)+100(CG)+200(GJ)=800$ km $D_{C10}=200(JIE)+100(EA)+200(ABC)+100(CD)+300(DHK)+100(KJ)=1000$ km $D_{C11}=200(JIE)+100(EA)+200(ABC)+100(CD)+100(DH)+300(HKJ)=1000$ km $D_{C12}=200(JIE)+100(EA)+200(ABC)+200(CDH)+300(HKJ)=1000$ km $D_{C13}=100(JI)+200(IEA)+200(ABC)+100(CD)+300(DHK)+100(KJ)=1000$ km $D_{C14}=100(JI)+200(IEA)+200(ABC)+100(CD)+100(DH)+300(HKJ)=1000$ km $D_{C15}=100(JI)+200(IEA)+200(ABC)+200(CDH)+300(HKJ)=1000$ km

Let's assume that for this example that the maximum allowed distance between the adjacent nodes is 500 km, the maximum cycle distance is 900 km, and the minimum number of EXC links for a cycle is three. As seen above, all cycles C1–C3 and C9–C15 have more than three EXC links and all cycles satisfy the maximum allowed distance between two nodes. However, only cycles C1–C3 and C9 satisfy the distance constraints.

Extracting a Best (Remaining) Valid Cycle

The term "extract" a cycle is used in the following for the operation of removing from the EXC graph of all EXC links that are on that cycle. Each extraction, or "iteration" leaves a residual graph, and the next cycle is extracted from the respective residual graph. A cycle is extracted as many times as possible. For example, if a cycle has two or more demands on each link, then the cycle is extracted at least twice.

It is obvious that selection of the first cycle to be extracted has an important impact on the selection of the cycle solution. On the other hand, the quest for the best solution may take a long time in large networks since the number of all possible variants could be very large. Therefore, the invention proposes a solution that compromises between the time and the number of iterations. To limit the computational time, throughout the cycle identification and extraction processes, the number of demands satisfied along each branch of the tree is counted, to choose the branch in the tree that satisfies the most number of demands as the solution.

Figure 5C:
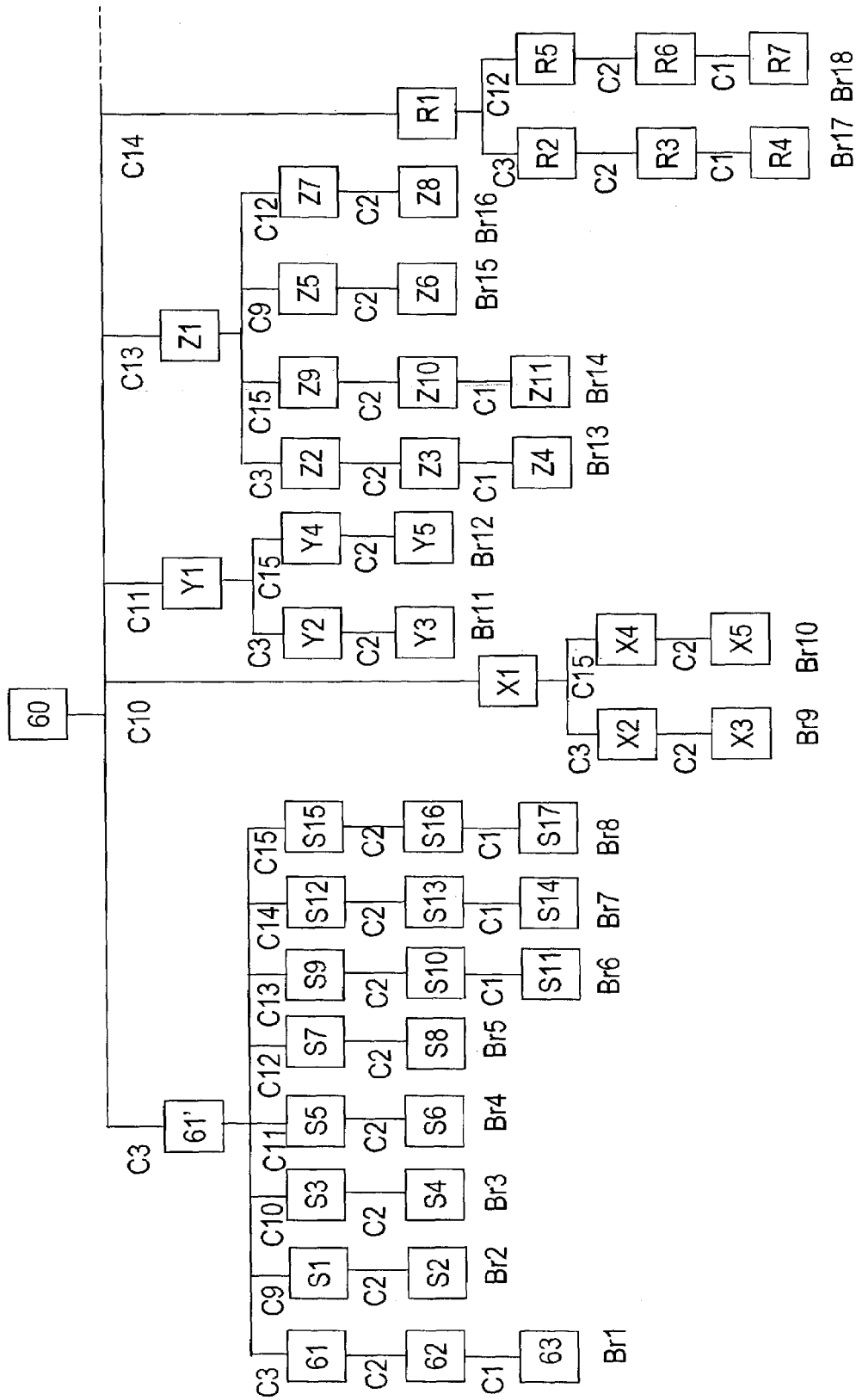
FIG. 5c shows how the first cycle to be extracted is selected for the graph of FIG. 4.
Figure 6C:
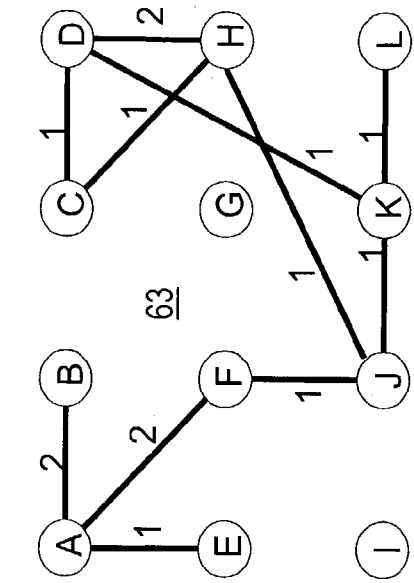
Figure 6C:
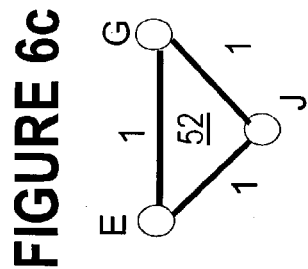

To find the 'best' cycle to be extracted, step 35, a residual graph tree is constructed as shown in FIG. 5c and explained using the examples of FIGS. 6a to 6c. The tree of FIG. 5c is constructed using as the root the graph 60 of FIG. 4. Each branch of this tree comprises in succession the residual EXC graphs obtained after extraction of a cycle. The extracted cycles are shown along the branch. In the end, the branch that eliminates most EXC links is selected, and the first 'depth' cycle is selected as the best valid cycle and extracted from the EXC graph. It is to be noted that that not all possible branches are illustrated in FIG. 5c. It is also to be noted that while cycles C10–C15, are not considered later for the solution (since they do not satisfy the distance constraint) they are included in the graph of FIG. 5c for illustrating how the graph is constructed.

Branch Br1 in FIG. 5c is constructed by first extracting the cycle C3, followed by C2 and C1; this will eliminate 16 EXC links. FIG. 6a shows how C3 is extracted twice (5×2 EXC links) leaving a residual EXC graph 61, FIG. 6b shows how cycle C2 is extracted once (3 EXC links), leaving a residual graph 62, and FIG. 6c shows extraction of C1 (3 EXC links).

Branch Br2 is constructed by first extracting C3, then C9, and finally C2. Reference to FIG. 4 shows that the total number of extracted EXC links is 13. Details or illustrations are not provided for how the graphs are extracted along branches Br2–Br18 for brevity's sake; the residual EXC graphs for these branches are identified with S, X, Y and Z, respectively. To summarize:

TABLE

Comparison between solution cycles:

| Branch No. | Cycles along branch | EXC links |
|---|---|---|
| Br1 | C3, C3, C2, C1 | 16 |
| Br2 | C3, C9, C2 | 13 |
| Br3 | C3, C10, C2 | 14 |
| Br4 | C3, C11, C2 | 14 |
| Br5 | C3, C12, C2 | 13 |
| Br6 | C3, C13, C2, C1 | 17 |
| Br7 | C3, C14, C2, C1 | 17 |
| Br8 | C3, C15, C2, C1 | 16 |
| Br9 | C10, C3, C2 | 14 |
| Br10 | C10, C15, C2 | 15 |
| Br11 | C11, C3, C2 | 14 |
| Br12 | C11, C15, C2 | 14 |
| Br13 | C13, C3, C2, C1 | 17 |

TABLE-continued

Comparison between solution cycles:

| Branch No. | Cycles along branch | EXC links |
| --- | --- | --- |
| Br14 | C13, C15, C2, C1 | 17 |
| Br15 | C13, C9, C2 | 15 |
| Br16 | C13, C12, C2 | 15 |
| Br17 | C14, C3, C2, C1 | 17 |
| Br18 | C14, C12, C2, C1 | 17 |

The maximum number of EXC links that can be extracted is 16 (all branches that eliminate 17 EXC links have invalid cycles). To reiterate, the cycles C10–C15 that do not satisfy the distance constraints are illustrated only for showing that the number of variants may be quite large even for a simple network.

In conclusion for the example given here, the best solution cycle is C3, which give the maximum number of extracted links along Br1.

When cycle 50 is "extracted" from the graph 60, as shown in step 36 of the flowchart on FIG. 3b, graph 60 is updated accordingly by subtracting the extracted EXC links of this cycle, as discussed above. FIG. 6a shows the EXC graph 60, the best valid cycle 50 and the residual graph 61. Cycle 50 is extracted twice, since all of its 'sides' support two connections. After extraction, residual graph 61 has no connection between nodes A and C or between nodes C and G, A and I, or I and J. Also, the number of EXC connection on link J–G becomes 2, since two EXC connections haves been extracted from this link.

It is evident that the residual graph 61 still comprises cycles that can be extracted. As shown by the branch 'Yes' of decision block 37 of FIG. 3b, steps 31 to 37 are repeated until all cycles are extracted. A new spanning tree is constructed, this time for the residual graph 61, by first selecting the root node, then 'connecting' the root with each adjacent node, etc, and adding to the tree all links that have not been seen. Decision block 37 also provides an alternative option of limiting the number of cycles extracted to N.

In our example, node J is again selected as the root for the spanning tree for the residual graph 61, having a degree of 7 (see residua graph 61 on FIG. 6a), while node A has a degree of only 5. The spanning tree for graph 61 is not illustrated, since we can use the spanning tree shown in FIG. 5a or 5b, where some of the links and nodes A, I and B are eliminated. As a result, the only cycles available on this spanning tree are C1 and C2. As well, the residual graph tree in this case has only one branch (since nodes A and I were removed), with cycles C1 and C2. This time, the best valid cycle is any one of C1 and C2. Let's assume that we first select C2, denoted with 51 on FIG. 6b. Once this cycle is extracted from residual graph 61, the new residual graph 62 still comprises cycles, so that a new iteration of steps 31 to 37 is possible.

The next iteration again uses node J as the root, which in this case has the same degree (5) as node A on residual graph 62. It is to be noted that node A could have been selected as the root of the new spanning tree; however, a brief reference to the optical layer network shown in FIG. 2a shows that there is no cycle available from a spanning tree with the root at node A. In this case, the only cycle that is valid on the spanning tree using again the root J is cycle C1, denoted with 52, which is now extracted as shown in FIG. 6c to leave the residual graph 63.

Figure 7A:
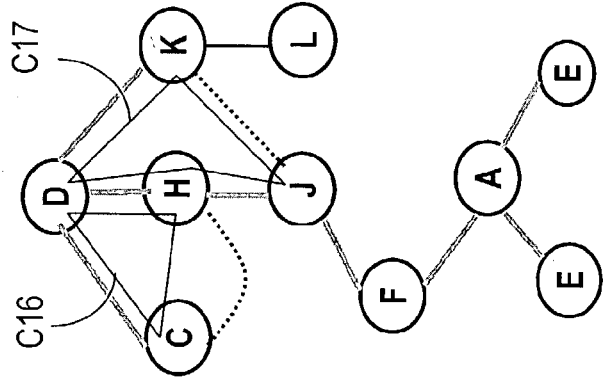
FIG. 7a shows a spanning tree for finding the cycles basis for the residual graph of FIG. 6c.

Since the residual graph 63 still comprise cycles, a new iteration of steps 31–37 takes place. Now, node D with a degree of 4 is selected as the root for the spanning tree (A is not considered for the same reasons as above), which is shown in FIG. 7a. The cycles identified on this tree are:

DCHD=C16 and
DHJKD=C17.

Cycle DHJKD is not valid, since there is no optical route that connects these nodes D, H, J, K and D in this order.

Figure 7B:
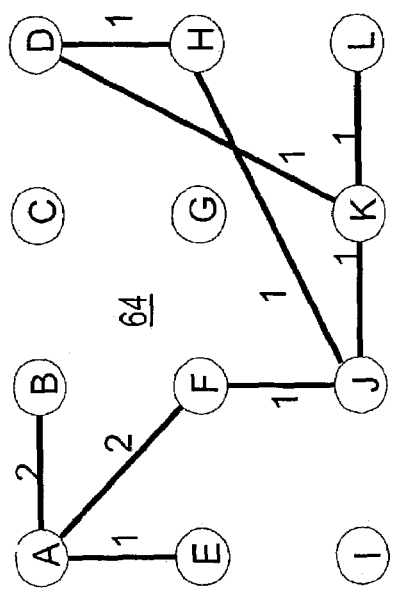
FIG. 7b shows how a last remaining cycle is extracted from the residual graph of FIG. 6c.
Figure 7B:
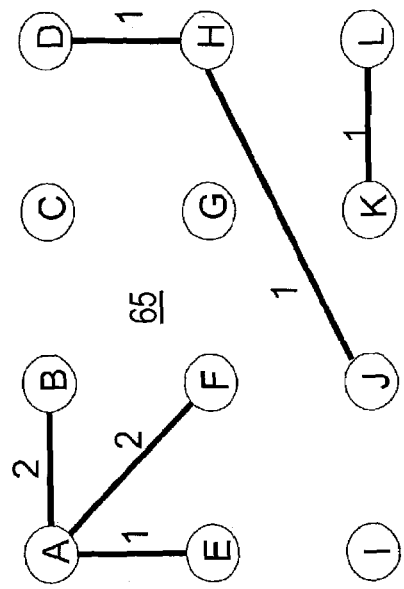

FIG. 7b illustrates how cycle 53 (DCHD) is extracted from residual graph 63, to provide a new residual graph 64.

It is apparent that there are no more full cycles available: the residual graph 64 has a plurality of EXC links that do not form any cycle. Nonetheless, the respective EXC links must be protected, which is performed using EXC link group segments, as shown in step 38 on flowchart of FIG. 3b.

Extracting EXC Groups

Figure 8A:
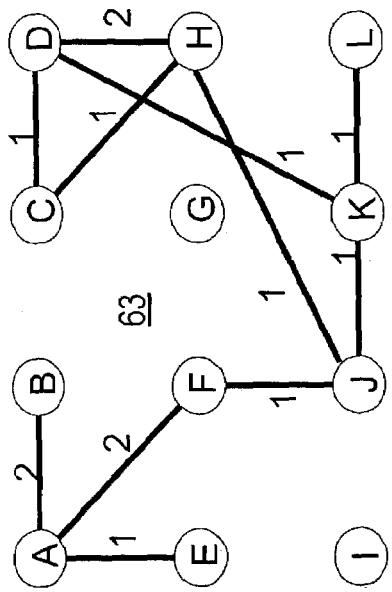
FIGS. 8a–8c show how EXC groups are successively extracted from the residual graph of FIG. 6c.
Figure 8A:
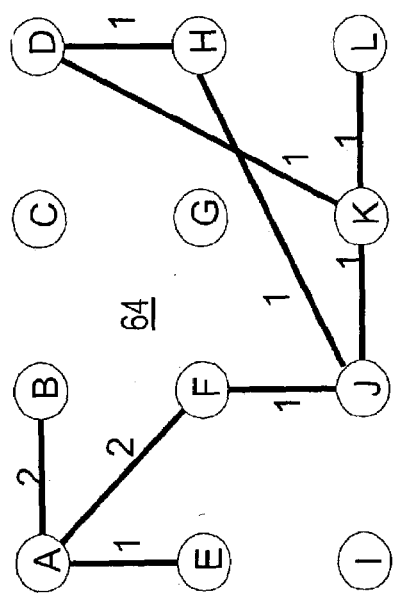
Figure 8B:
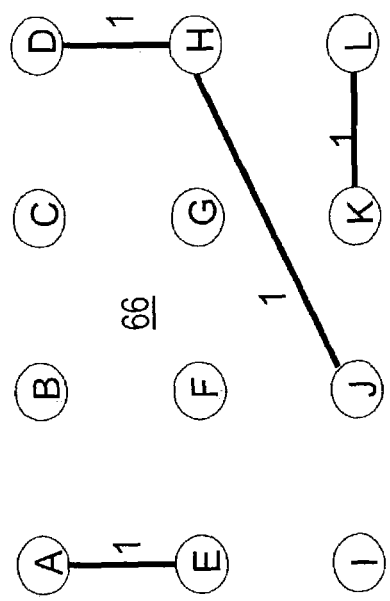
Figure 8B:
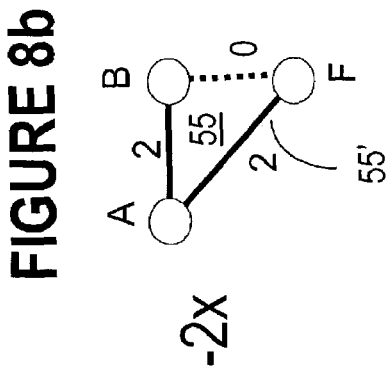
Figure 8B:
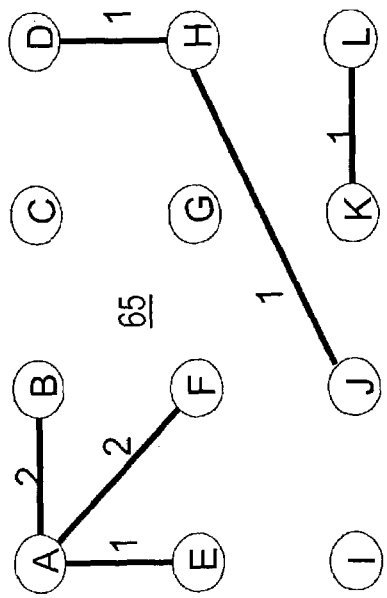
Figure 8C:
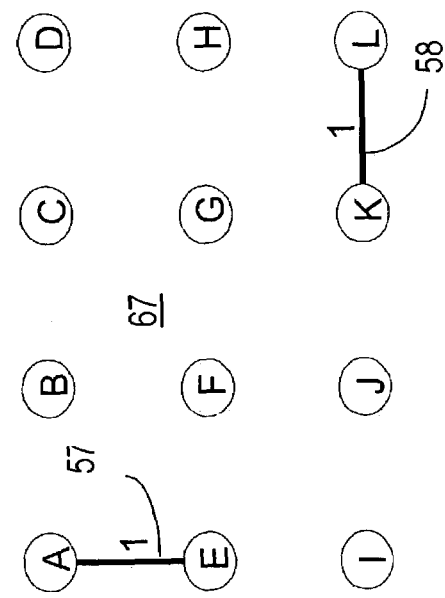
Figure 8C:
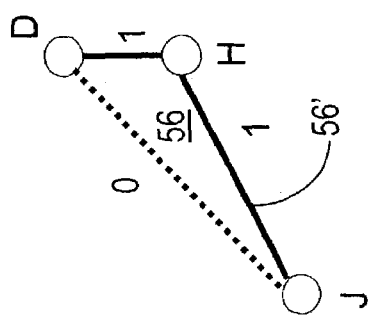
Figure 8C:
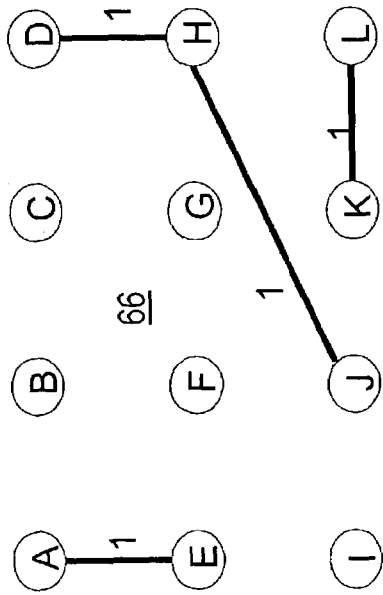

The mesh routing method allows traversal from one node to another without the presence of an EXC link, under certain circumstances. For example, a cycle may be constructed by assuming a missing EXC link between two nodes, as long as the resulting cycle is valid (i.e. it has support at the optical layer) and/or if it satisfies one or more constraints. The constraints may be the same as for the cycles, or different. FIGS. 8a to 8c show how incomplete cycles (EXC groups) are successively extracted from the residual graph of FIG. 7b, without taking into account any constraint for the sake of the example.

Thus, the largest segment that can be extracted now from the residual graph 64 of FIG. 8b is a group 54' (FJKD) that has a distance of 600 km, shown in FIG. 8a using a thick line. There is no link between nodes F and D; nonetheless, since the distance between nodes F and D is small enough (300 km in our example), an EXC link F–D is added to the group 54' to form a cycle FJKDF denoted with 54. This 'missing' link is shown in a dotted line, and marked with "0", to show that there is no demand involving it. Group 54' is extracted as a complete cycle leaving a residual graph shown at 65. As before, cycle 54 is extracted from the graph only if the group and the added link "lie" on an optical cycle. We now apply the above constraints; in this example, the distance of cycle 54 is 900 km, so that this cycle is valid.

After group 54' is extracted, the residual graph 65 is checked for identifying other potentially valid groups. A group 55' (ABF) is identified and extracted from the residual graph 65. Now EXC link B–F is added to the group 55' giving a cycle ABFA, denoted with 55, as shown in FIG. 8b. Since there are two links on the sides A–B and A–F, this cycle may be extracted twice from the residual graph 65, leaving a residual graph 66.

FIG. 8c shows the next iteration. A group 56' (JHD) is converted to a cycle 56 (JHDJ) by adding a link J–D, and the cycle is extracted from residual graph 66. The residual graph 67 now includes only segments 57 (A–E) and 58 (K–L) of size '1', called as before "onesies". These are all protected separately as 1+1 demands.

It is to be noted that in some cases more than one EXC link may be added to complete a cycle, as long as there is support at the optical layer, the shortest distance between the two nodes does not exceed a given distance, and the cycle does not exceed the maximum size. Group selection must attempt to include onesies in the group for minimizing the number of protect wavelengths, having in view that the residual onesies must be 1+1 protected.

Also, group identification and processing is initiated if the size of the cycle basis is "0" (no cycles), as shown by branch "Yes" of decision block 33.

Pre-Configuring the Protection Trails

With all cycles and groups extracted from the graph, the protection trails are routed now as shown in step 40 and the working paths are associated with a respective protect trails as discussed in connection with FIG. 2b.

Figure 9G:
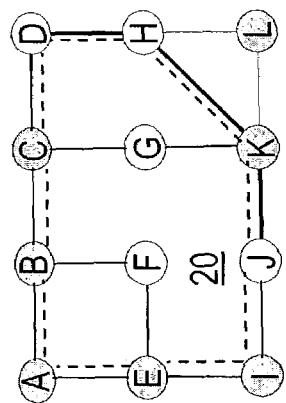
Figure 9G:
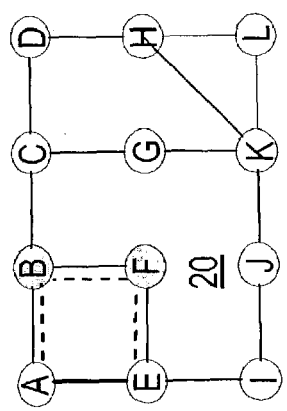
Figure 9G:
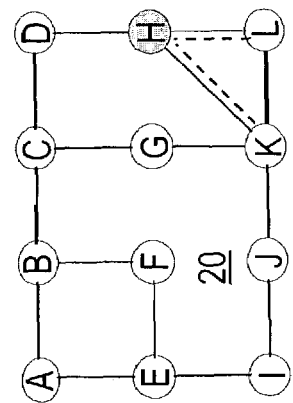
Figure 9G:
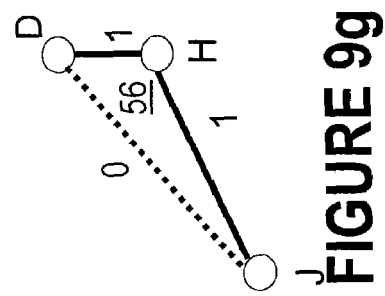

FIGS. 9a–9i show the cycles created before, and the respective optical layer implementation. The nodes shown in gray are optical passthrough nodes, where there is no termination of the EXC layer. As shown in FIG. 9a, cycle 50 is implemented by the following optical paths:

ABC (B is a passthrough node shown in gray),
CG
GKJ (K is a passthrough node shown in gray)
JI and
IEA (E is a passthrough node shown in gray).

In this case, a working wavelength $\lambda w_{AC}$ assigned to an optical working path A–C is protected by a protect trail CGKJIEA, implemented using protect wavelengths $\lambda p_{CG}$ set-up between nodes C–G, $\lambda p_{GJ}$ set-up between nodes G and J along path GKJ, $\lambda p_{CG}$ set-up between nodes J and I, and $\lambda p_{IA}$ set-up between nodes I and A along path IEA. The same cycle protects the working wavelength $\lambda w_{CG}$ assigned to optical path C–G. In this case, the protect trail GKJIEABC uses protect wavelengths $\lambda p_{GJ}$, $\lambda p_{JI}$, $\lambda p_{IA}$ and $\lambda p_{AC}$.

FIG. 9b shows cycle 51 implemented by optical paths FBCG (B and C are passthrough nodes), GKJ (K is a passthrough node) and JIEF (I and E are passthrough nodes). In this case, the working wavelength $\lambda w_{FG}$ is protected by a protect trail FEIJKG implemented using protect wavelengths $\lambda p_{GJ}$ and $\lambda p_{JF}$, the working wavelength $\lambda w_{GJ}$ is protected by protect trail GCBFEIJ using protect wavelengths $\lambda p_{JF}$ and $\lambda p_{FG}$ and the working wavelength $\lambda w_{JF}$ is protected by protect trail FBCGKJ using protect wavelengths $\lambda p_{FG}$ and $\lambda p_{GJ}$.

Implementation of the remaining cycles 52, 53, 54 and groups 55', 56' and 57 are shown in FIGS. 9c to 9g.

Figure 9H:
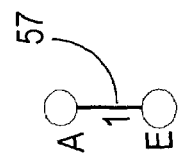
Figure 9I:
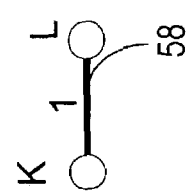

The segments (i.e. the onesies) that cannot be included in any cycle are treated as 1+1 demands, as shown in FIGS. 9h and 9j. Thus, connection 57 (A–E) that uses a working wavelength $\lambda w_{AE}$ may be individually protected by a protection wavelength $\lambda p_{EA}$ that along optical path EFBA. Connection 58 carried by the working wavelength $\lambda w_{KL}$ shown in FIG. 10i, could be protected by a protection wavelength $\lambda p_{LK}$ along optical path KHL.

It is to be noted that other methods for selecting the cycles at the EXC layer may be considered. As seen above, selection of the first cycle to be extracted is important, and the number of variants to be calculated according to this method may increase dramatically and become un-computational. Therefore, use of a cycle basis as described above using the node with the maximum degree will provide the cycle solution in an acceptable time-frame.

We claim:

1. In an agile network (APN) where each connection demand is automatically set-up along a respective working trail, each working trail having one or more successive optical working paths, a method of pre-configuring protect trails, comprising the steps of:
 (a) at the electrical layer, preparing an electrical layer related (EXC) graph where each connection demand is represented by an EXC link;
 (b) extracting a best valid cycle associated with a maximum number of EXC links from said EXC graph; and
 (c) at the optical layer, pre-configuring said best valid cycle into protect trails, each of said protect trails being associated with an optical working path on said best valid cycle.

2. A method as claimed in claim 1, further comprising the steps of:
 (d) on a residual EXC graph obtained after extraction of said best valid cycle, identifying a next best valid cycle and extracting said next best valid cycle from said residual EXC graph; and
 (e) repeating step (c) for said next best valid cycle, until all valid cycles are extracted from said residual EXC graph.

3. A method as claimed in claim 2, wherein the number of iterations of step (e) is limited to a preset number of iterations.

4. A method as claimed in claim 2, further comprising the steps of:
 (f) on said residual EXC graph, identifying a valid group of EXC links and extracting said valid group as a complete cycle; and
 (g) pre-configuring said valid group into protect trails, each protect trail associated with an optical working path represented by an EXC link on said group.

5. A method as claimed in claim 4, further comprising the step of repeating step (g) for a next valid group, until all valid groups have been extracted from said residual EXC graph.

6. A method as claimed in claim 5, further comprising the step of pre-configuring a 1:1 protect trail for each optical working path represented by an EXC link left on said residual EXC graph.

7. A method as claimed in claim 1, wherein said step of extracting comprises:
 finding a cycles basis for said EXC graph;
 validating the cycles of said cycles basis;
 identifying said best valid cycle; and
 subtracting from said EXC graph all EXC links of said best valid cycle.

8. A method as claimed in claim 7, wherein said step of identifying said best valid cycle comprises the steps of:
 constructing a residual graph tree using for each branch a different cycle of said cycles basis as a first cycle to be extracted;
 selecting from said residual graph tree a branch that extracts the maximum number of EXC links; and
 identifying said respective first cycle as said best cycle.

9. A method as claimed in claim 7, wherein said step of finding a cycles basis comprises the step of constructing a spanning tree for said EXC graph and finding a plurality of EXC cycles on said spanning tree.

10. A method as claimed in claim 7, wherein said step of validating comprises the step of eliminating from said cycles basis all cycles that are not supported by an optical layer cycle in said APN.

11. A method as claimed in claim 10, wherein said step of validating further comprises the step of eliminating from said cycles basis all EXC cycles that do not satisfy an optical layer constraint.

12. A method as claimed in claim 10, wherein the number of cycles in said cycles basis is limited to a preset number of cycles.

13. In an agile network where a connection demand is automatically routed along an optical-layer trail, a trail having one or more optical working paths, a method of automatically re-routing said demand along a protect trail whenever an optical working path is affected by a fault, comprising:

generating an optical-layer cycle that has a plurality of successive optical paths;

for each optical path on said cycle, identifying a best remaining cycle associated with a maximum number of links of an associated EXC graph as a protect trail; and pre-configuring a plurality of protection switching scenarios by associating each optical path on said cycle with a respective protect trail for enabling fast traffic recovery when any of said optical paths fail.

14. A method as claimed in claim 13, wherein said step of generating comprises:

preparing the associated EXC graph where each user demand is represented by an EXC link;

finding a cycles basis for said EXC graph;

validating the cycles of said cycles basis;

identifying said optical-layer cycle among all valid cycles of said cycle basis; and subtracting from said EXC graph all EXC links of said identified cycle.

15. A method as claimed in claim 14, wherein said step of identifying said optical-layer cycle comprises:

constructing a residual graph tree using for each branch a different cycle of said cycles basis as a first cycle to be extracted;

selecting from said residual graph tree a branch that extracts the maximum number of EXC links; and identifying said respective first cycle as said optical-layer cycle from said branch.

16. A method as claimed in claim 14, wherein said step of finding a cycles basis for said EXC graph comprises constructing a spanning tree from said EXC graph, and identifying all fundamental cycles on said EXC graph.

17. A method as claimed in claim 14, wherein said step of validating the cycles of said cycles basis comprises identifying a cycle of said basis as a valid cycle when said cycle is supported by an optical layer cycle; and when said optical layer cycle satisfies one or more constraints.

18. A method as claimed in claim 17, wherein said step of finding a cycles basis further comprises identifying additional cycles on said EXC graph whenever the number of said valid cycles is less than a preset number.

19. In an agile photonic network (APN), a cycles management unit for sharing the protection bandwidth between a plurality of optical working paths, comprising:

a trail routing unit for automatically setting-up a working trail for each connection demand, said working trail having one or more successive optical working paths;

a cycles solution generator for providing a cycles basis for a given configuration of connection demands in said APN;

a cycles validating unit for identifying a best valid cycle in said cycles basis associated with a maximum number of links on a cycles graph; and a cycles processing unit for associating each optical working path on said best valid cycle with a respective protect trail on said best valid cycle.

20. A cycles management unit as claimed in claim 19, wherein said cycles processing unit maintains a list with the association between each optical working path and a respective protect trail.

21. A cycles management unit as claimed in claim 19, further comprising means for storing a list of constraints used by said cycles validating unit.

* * * * *